US011368430B2

(12) United States Patent
Lee et al.

(10) Patent No.: US 11,368,430 B2
(45) Date of Patent: Jun. 21, 2022

(54) DOMAIN NAME SERVER BASED VALIDATION OF NETWORK CONNECTIONS

(71) Applicant: Verizon Patent and Licensing Inc., Arlington, VA (US)

(72) Inventors: Vincent M. Lee, Leesburg, VA (US); K. Kent Paul Shuart, Ashburn, VA (US); Tahir H. Khan, Aldie, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 346 days.

(21) Appl. No.: 16/369,987

(22) Filed: Mar. 29, 2019

(65) Prior Publication Data

US 2020/0314064 A1    Oct. 1, 2020

(51) Int. Cl.
*H04L 9/40* (2022.01)
*H04L 61/4511* (2022.01)
*H04L 61/4552* (2022.01)

(52) U.S. Cl.
CPC ...... *H04L 63/0236* (2013.01); *H04L 61/1511* (2013.01); *H04L 61/1552* (2013.01); *H04L 63/14* (2013.01); *H04L 63/162* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,959,006 B1 * | 10/2005 | Sarnikowski | H04L 41/0803 370/468 |
| 10,057,243 B1 * | 8/2018 | Kumar | H04L 9/321 |
| 11,025,655 B1 * | 6/2021 | Eren | H04W 12/12 |
| 11,121,947 B2 * | 9/2021 | Narayan | H04L 67/02 |
| 11,201,853 B2 * | 12/2021 | Ogale | H04L 43/16 |
| 2012/0084423 A1 * | 4/2012 | McGleenon | H04L 61/1511 709/223 |

(Continued)

OTHER PUBLICATIONS

Chen et al.; Efficient suspicious URL filtering based on reputation; 2014; retrieved from the Internet https://www.sciencedirect.com/science/article/pii/S2214212614001410; pp. 1-11, as printed. (Year: 2014).*

*Primary Examiner* — Michael W Chao

(57) ABSTRACT

A device receives a first network connection request, that does not include a domain name server (DNS) query, for establishment of a connection to a target destination. The device determines whether information identifying the target destination matches information identifying a permissible destination, included in a set of permissible destinations, identified in connection with a second network connection request, where the second network connection request included a prior DNS query and was received prior to the first network connection request being received, and where a prior security verification was performed in connection with the second network connection request and the prior DNS query. The device selectively establishes or blocks the connection to the target destination as a response to the first network connection request based on whether the information identifying the target destination matches the information identifying the permissible destination included in the set of permissible destinations.

20 Claims, 7 Drawing Sheets

(56) References Cited

U.S. PATENT DOCUMENTS

| | | | |
|---|---|---|---|
| 2013/0074186 A1* | 3/2013 | Muttik | G06F 21/51 726/24 |
| 2013/0097329 A1* | 4/2013 | Alex | H04L 61/1511 709/228 |
| 2014/0215196 A1* | 7/2014 | Berlin | G06F 21/572 713/2 |
| 2014/0281525 A1* | 9/2014 | Acar | H04L 9/3213 713/168 |
| 2015/0358285 A1* | 12/2015 | Ellard | H04L 41/00 726/12 |
| 2016/0006693 A1* | 1/2016 | Salcedo | H04L 63/0236 726/1 |
| 2016/0119276 A1* | 4/2016 | Pandya | H04L 63/10 709/223 |
| 2016/0164946 A1* | 6/2016 | Bazzi | G06F 21/53 709/219 |
| 2016/0197898 A1* | 7/2016 | Hozza | H04L 63/1466 713/168 |
| 2016/0323106 A1* | 11/2016 | Roper | G06F 21/51 |
| 2016/0330287 A1* | 11/2016 | Smith | H04L 12/2812 |
| 2016/0337104 A1* | 11/2016 | Kalligudd | H04L 5/0053 |
| 2017/0041332 A1* | 2/2017 | Mahjoub | H04L 43/0876 |
| 2017/0222974 A1* | 8/2017 | Cathrow | H04L 61/1511 |
| 2017/0251003 A1* | 8/2017 | Rostami-Hesarsorkh | G06F 21/562 |
| 2017/0295196 A1* | 10/2017 | Arnell | H04L 63/1425 |
| 2017/0331780 A1* | 11/2017 | Reddy | H04L 61/1511 |
| 2018/0013726 A1* | 1/2018 | Lamb | H04L 41/28 |
| 2018/0034827 A1* | 2/2018 | Kaliski, Jr. | H04L 63/123 |
| 2018/0097835 A1* | 4/2018 | McGrew | H04L 63/1408 |
| 2018/0248701 A1* | 8/2018 | Johnson | H04L 9/3236 |
| 2019/0058718 A1* | 2/2019 | Pangeni | H04L 63/1466 |
| 2019/0081952 A1* | 3/2019 | Wood | H04L 63/1491 |
| 2019/0163912 A1* | 5/2019 | Kumar | H04L 9/0643 |
| 2019/0318061 A1* | 10/2019 | Winograd | G06F 21/44 |
| 2020/0112537 A1* | 4/2020 | Nema | H04L 61/10 |
| 2020/0293635 A1* | 9/2020 | Martin | G06F 21/123 |
| 2020/0293636 A1* | 9/2020 | Martin | G06F 9/5027 |
| 2020/0296090 A1* | 9/2020 | Smeets | H04W 12/35 |
| 2021/0173929 A1* | 6/2021 | Dalvi | G06F 21/564 |
| 2021/0192043 A1* | 6/2021 | Bhary | G06F 21/566 |
| 2021/0250330 A1* | 8/2021 | Gurney | H04L 63/101 |
| 2021/0377303 A1* | 12/2021 | Bui | G06F 40/14 |

\* cited by examiner

DOMAIN NAME SERVER BASED VALIDATION OF NETWORK CONNECTIONS

BACKGROUND

A user device can request information from a domain name system (DNS) associated with a gateway device to access a target destination. For example, the user device can provide, to the gateway device, a DNS query including a domain name of the target destination, and the gateway device can perform a DNS lookup to identify an Internet Protocol (IP) address or multiple IP addresses of the target destination that corresponds to the domain name. In this case, the gateway device can use the IP address to establish a connection between the user device and a server of the target destination associated with the IP address.

DETAILED DESCRIPTION OF PREFERRED EMBODIMENTS

Figure 1A:
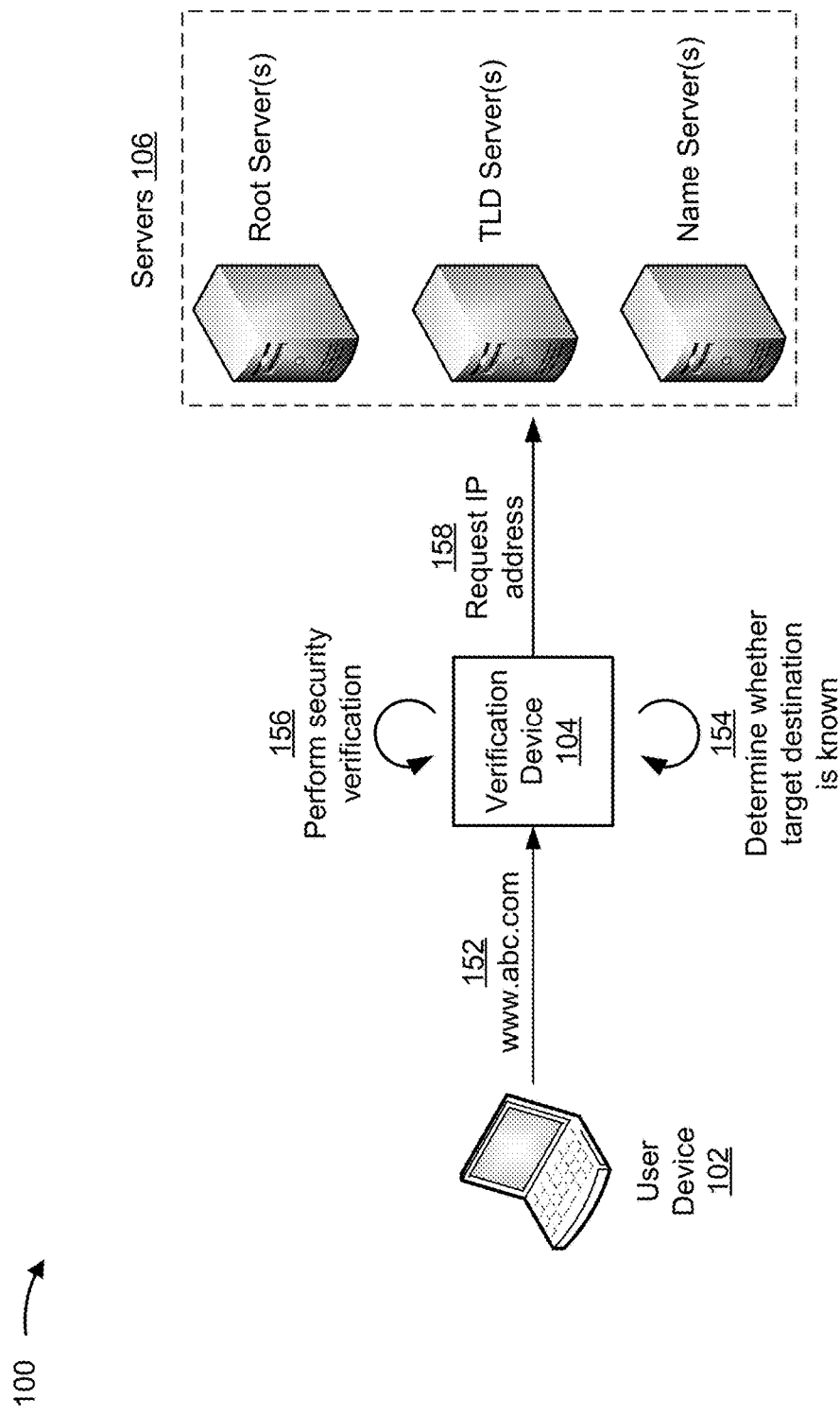
FIGS. 1A-1D are diagrams of an example implementation described herein.

The following detailed description of example implementations refers to the accompanying drawings. The same reference numbers in different drawings can identify the same or similar elements.

A gateway device can receive a connection request including a DNS query from a user device, and can identify an IP address or IP addresses of a target destination based on a domain name in the DNS query. The gateway device can perform a security verification based on the DNS query. For example, the gateway device can determine whether the domain name is included in a blacklist of potentially harmful destinations (e.g., websites known to result in malware attacks on user devices, websites associated with botnets, websites associated with phishing attacks, websites associated with blocked content, such as pornography or violent content, and/or the like). Similarly, the gateway device can determine whether the domain name is included in a whitelist of permissible destinations (e.g., websites of known providers that are not likely to result in malware attacks on user devices).

When a security verification results in identifying a destination as a potentially harmful destination, the gateway device can block a connection to the destination. For example, the gateway device can redirect the user device to connect to a webpage that indicates that the target destination is potentially harmful. Alternatively, when the security verification results in identifying the target destination as not harmful, the gateway device can establish a connection between the user device and the target destination, thereby enabling access to the target destination for the user device. By a gateway device performing such security checks on DNS queries, a likelihood of a user device being directed to harmful destinations is decreased, relative to fulfilling DNS queries without performing a security verification.

However, some user devices can provide connection requests that do not include DNS queries. For example, a gateway device can receive, from a user device, a connection request that includes an IP address of a target destination, without providing a domain name, and the gateway device can connect the user device to the target destination using the IP address to fulfill the connection request. In this case, if the target destination is a malicious destination, the gateway device could direct the user device to the malicious destination without performing a security verification, since the gateway device has no domain name to compare against, for example, a whitelist or a blacklist.

Some implementations described herein provide domain name server based validation of network connections. For example, a verification device can receive a connection request identifying an IP address or IP addresses, and can determine whether the IP address or IP addresses is/are stored in a DNS query cache that stores information identifying IP addresses corresponding to domain names for which a security verification was performed in connection with fulfilling a previous connection request. Based on an IP address being included in the DNS query cache, the verification device can confirm that a security verification was performed on a domain name corresponding to the IP address and the IP address was determined to not be associated with a malicious destination. In this case, the verification device can establish a connection between the user device and a target destination associated with the IP address.

In contrast, based on the IP address not being included in the DNS query cache, the verification device can determine that a security verification was not performed or that the security verification resulted in determining that the IP address was associated with a malicious destination. In this case, the verification device can block establishment of a network connection between the target destination and the user device. In this way, the verification device reduces a likelihood of establishing connections between user devices and malicious destinations, thereby improving security of user devices. Moreover, based on using a DNS query cache to store information identifying destinations for which a security verification was already performed, the verification device reduces a utilization of computing resources (e.g., processing resources) and/or network resources associated with performing duplicative security verifications.

FIGS. 1A-1D are diagrams of an example implementation 100 described herein. As shown in FIG. 1A, example implementation 100 includes a user device 102, a verification device 104, and a set of servers 106.

As further shown in FIG. 1A, and by reference number 152, verification device 104 can receive a network connection request. For example, user device 102 can provide a request for establishment of a connection to a target destination (e.g., a website, a device, a file transfer protocol (FTP) server, etc.) associated with a particular domain name (shown as www.abc.com). As shown by reference number 154, verification device 104 can determine whether the target destination is already known to verification device 104. For example, verification device 104 can determine whether information identifying the domain name is stored in a DNS query cache. As shown by reference number 156, verification device 104 can perform a security verification. For example, verification device 104 can determine whether the target destination is a malicious destination. In some implementations, verification device 104 can determine whether the target destination is a malicious destination based on validating the target destination against a list. For example, verification device 104 can determine whether the target destination is on a whitelist of permissible destinations, a blacklist of malicious destinations, and/or the like. In some implementations, verification device 104 may request and may receive a blacklist to enable verification device 104 to determine whether the target destination is on the blacklist.

In some implementations, verification device 104 can perform the security verification based on accessing the target destination. For example, using an IP address, as described in more detail herein, verification device 104 can connect to the target destination, and can perform one or more security checks, such as by transmitting information to the target destination, evaluating information received from the target destination, parsing text on a web page associated with the target destination, and/or the like. For example, verification device 104 may attempt to download software from the target destination and may run a malware detection procedure on the software. Additionally, or alternatively, verification device 104 may identify an indicia of a malicious destination, such as the destination having a domain name that is a misspelling of another common destination, the destination having text matching one or more words determined to be associated with malicious destinations, the destination attempting to automatically run one or more scripts upon accessing the destination, and/or the like.

Additionally, or alternatively, verification device 104 can perform the security verification in connection with another device, such as a security device. For example, verification device 104 can cause a security device that provides a sandbox environment to connect to the target destination and execute one or more malware detection procedures, antivirus procedures, and/or the like. In this case, verification device 104 can receive feedback from the security device indicating whether the target destination is to be classified as a malicious destination. In this way, based on using a sandbox environment of the security device, verification device 104 reduces a likelihood that a malicious destination uses malware to attack verification device 104 (and/or user device 102) relative to connecting directly to the malicious destination. Although some implementations described herein are described in terms of lists, other data structures can be used.

As further shown in FIG. 1A, and by reference number 158, verification device 104 can request an IP address from servers 106. For example, based on verifying that the target destination is not a malicious destination (or in connection with an attempt to verify whether the target destination is a malicious destination), verification device 104 can communicate with one or more root servers, top level domain (TLD) servers, name servers, and/or the like to determine an IP address that corresponds to the domain name. In this way, verification device 104 provides a DNS service for user device 102.

Figure 1B:
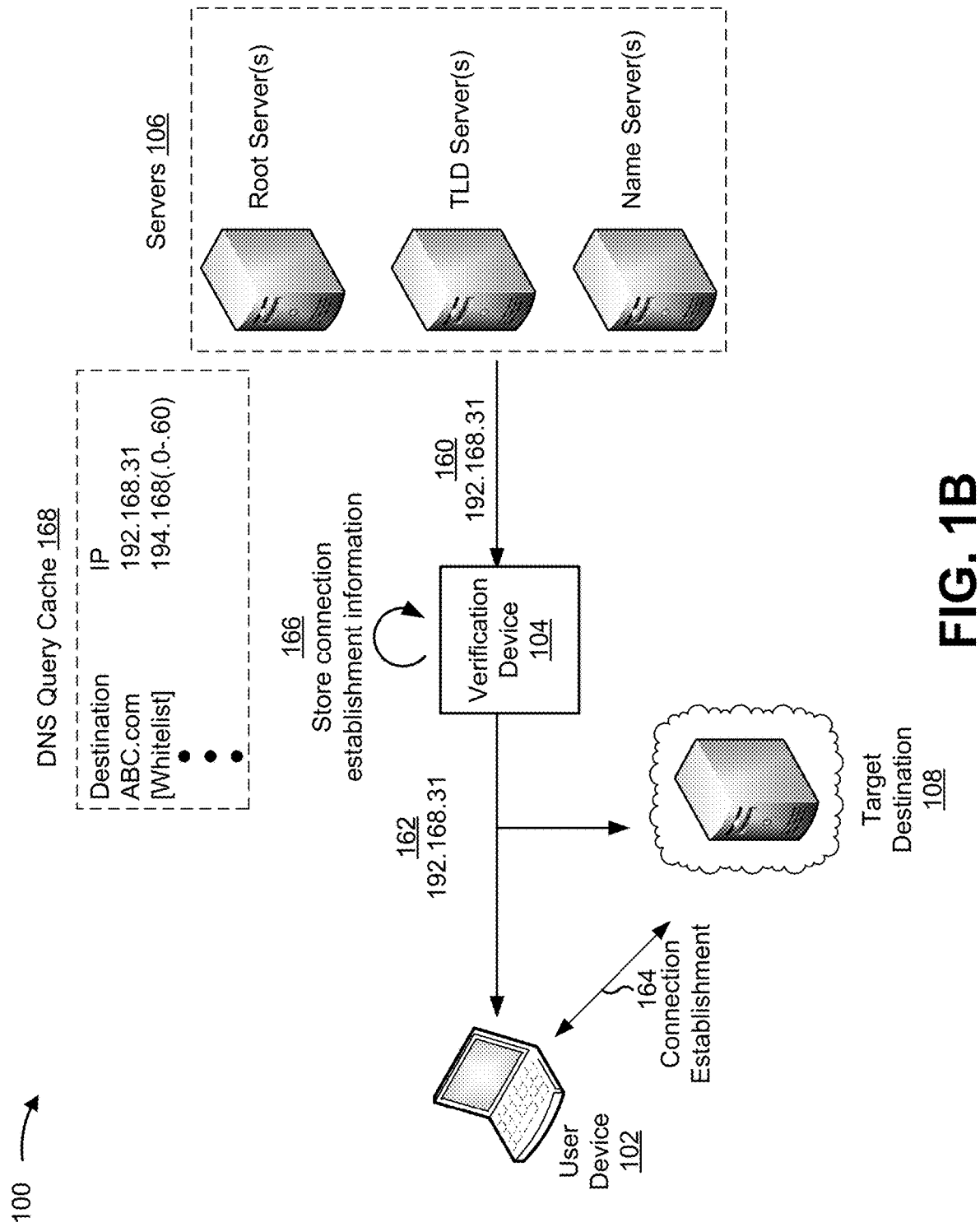

As shown in FIG. 1B, and by reference number 160, verification device 104 can receive a response from servers 106 identifying the IP address. For example, based on querying servers 106, verification device 104 can determine the IP address that corresponds to the domain name. As shown by reference numbers 162 and 164, verification device 104 can cause a connection to be established between user device 102 and target destination 108 to fulfill the network connection request. For example, using the IP address for target destination 108, which corresponds to the domain name received from user device 102, verification device 104 can establish the connection between user device 102 and target destination 108 to enable user device 102 to transmit information to target destination 108, receive information from target destination 108, and/or the like.

As further shown in FIG. 1B, and by reference number 166, verification device 104 can store connection establishment information in DNS query cache 168. For example, verification device 104 can store information identifying a domain name, an IP address, and/or the like based on performing the security verification on the domain name and determining the IP address that corresponds to the domain name. In some implementations, verification device 104 can store information in DNS query cache 168 without having performed a DNS query. For example, verification device 104 can receive a whitelist of IP addresses that are to be added to DNS query cache 168. In this case, a provider (Search.com), which may be a destination, a service providing whitelists for destinations, and/or the like, can provide validation information to indicate a range of IP addresses associated with the provider (194.168.0 through 194.168.60) that are verified as being permissible destinations. As shown in FIG. 1B, verification device 104 may store information identifying whitelisted IP addresses. In some implementations, verification device 104 may store information identifying whitelisted IP addresses separately from DNS query cache 168, and may check both DNS query cache 168 and a separate data structure storing whitelisted IP addresses when determining whether a target destination is a permissible destination.

In some implementations, verification device 104 can verify that a set of permissible destinations are authentic. For example, verification device 104 can use a cryptographic hash, a blockchain, and/or the like to determine that a set of permissible destinations is received from a verified source (e.g., a verified provider of whitelists), and that the set of permissible destinations has not been altered in transit from the verified source (e.g., via a man-in-the-middle type of malicious attack). In some implementations, verification device 104 can provide information to an external validation device to have the external validation device validate that a destination is to be included in a list of permissible destinations. In this way, verification device 104 stores information for use in subsequent determinations of whether to establish connections for network connection requests that do not include DNS queries. In this way, based on storing the information, verification device 104 reduces a utilization of resources associated with performing a security verification on each time a request is made to access the same destination.

Figure 1C:
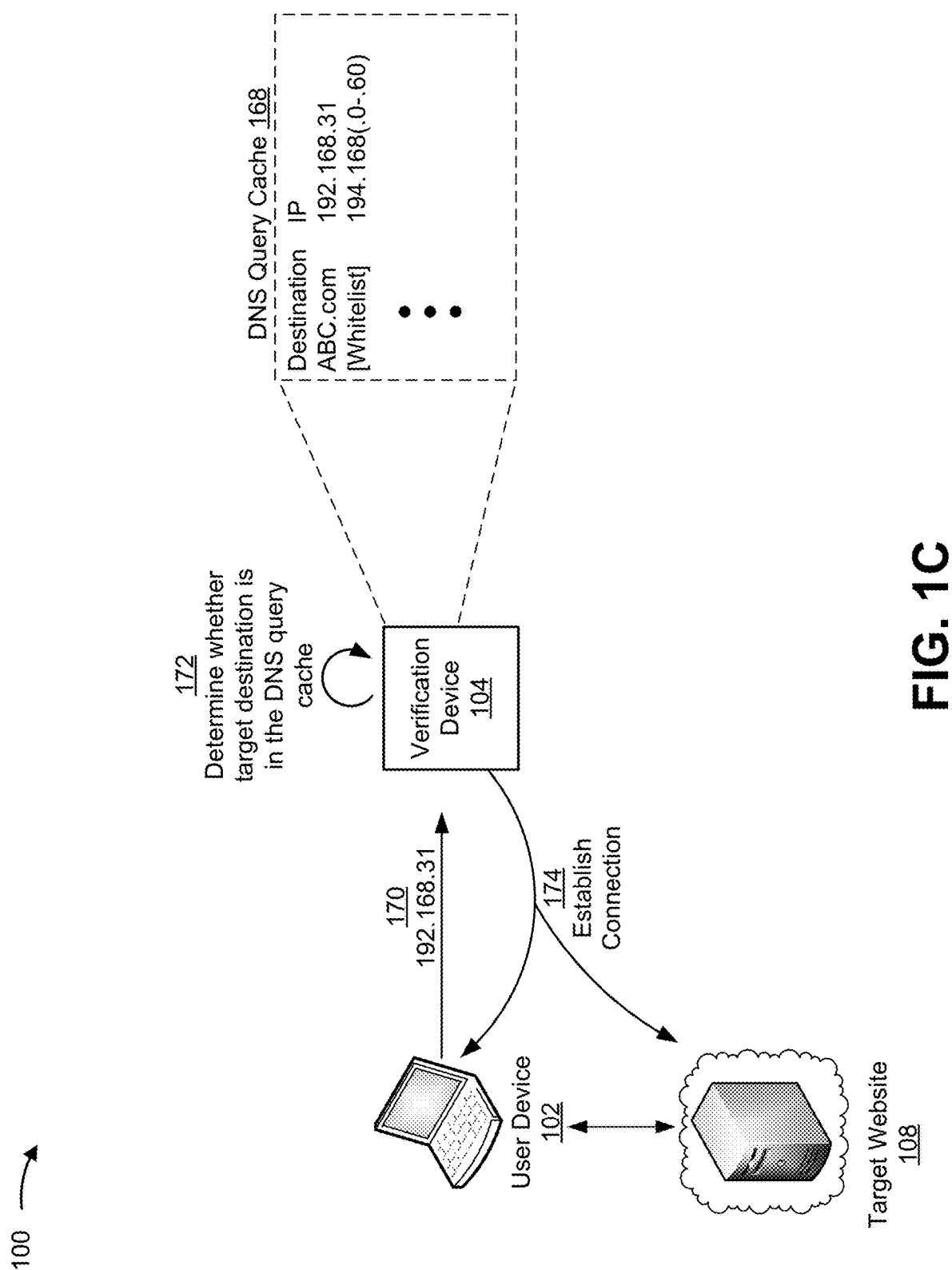

As shown in FIG. 1C, and by reference number 170, verification device 104 can receive a network connection request that does not include a DNS query. For example, verification device 104 can receive, from user device 102, a network connection request that includes an IP address. As shown by reference number 172, verification device 104 can determine whether a target destination associated with the IP address is in DNS query cache 168. For example, verification device 104 can search DNS query cache 168 to determine whether the IP address is included in DNS query cache 168, thereby indicating that the IP address was previously subject to a DNS query and an associated security verification or was identified in a set of permissible destinations as described above.

As further shown in FIG. 1C, and by reference number 174, based on determining that the target destination is included as a permissible destination in DNS query cache 168, verification device 104 can cause a connection to be established between user device 102 and target destination 108, which corresponds to the IP address. In this way, verification device 104 enables use of network connection requests without DNS queries while still ensuring that verification procedures associated with DNS queries are performed before establishing a connection (e.g., by performing the verification procedures at a time when a DNS query is performed for a previous network connection request and storing a result of the verification). In this way, security is improved for user devices 102 accessing target destinations by providing an IP address rather than a domain name.

Figure 1D:
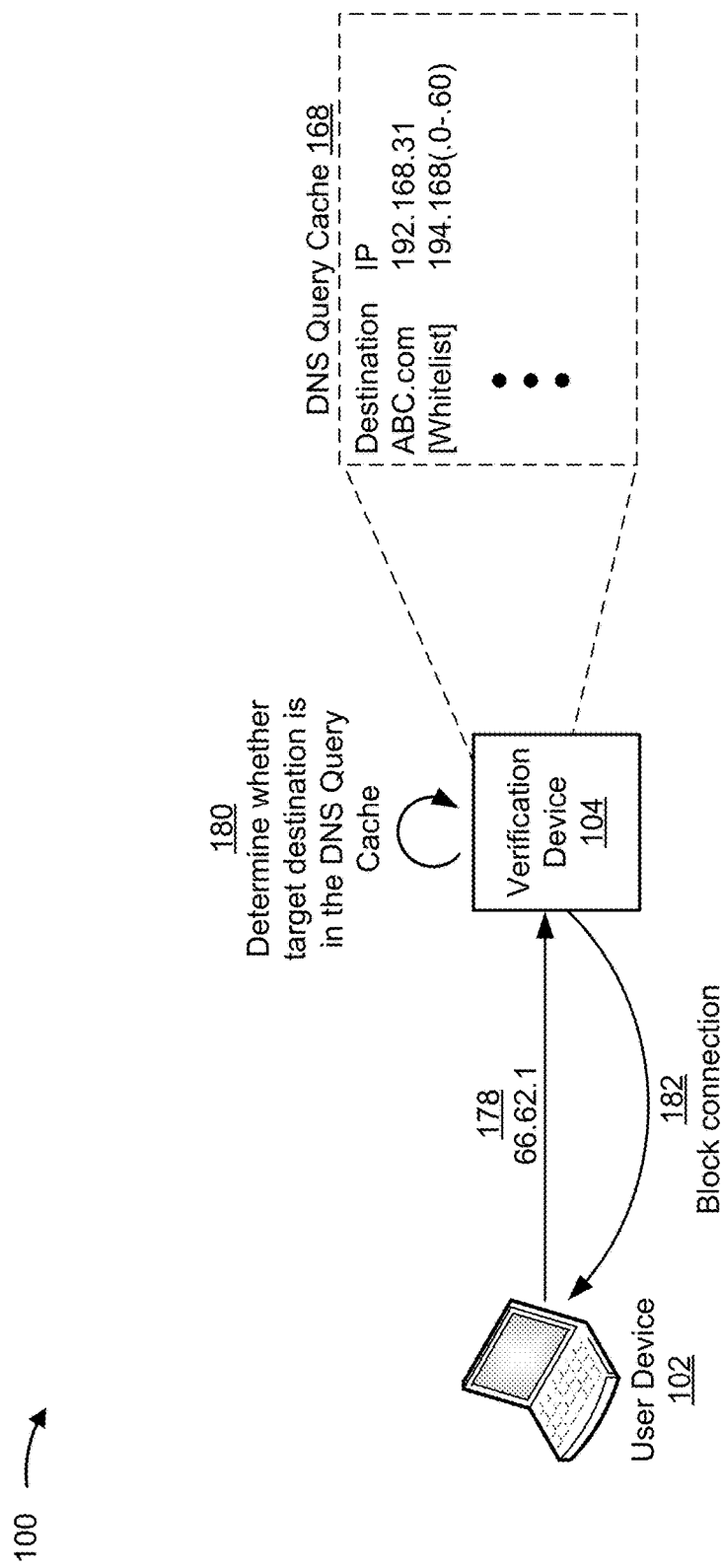

As shown in FIG. 1D, and by reference number 178, verification device 104 can receive another network connection request that does not include a DNS query. For example, verification device 104 can receive, from user device 102, a network connection request that includes another IP address (66.62.1). As shown by reference number 180, verification device 104 can determine whether a target destination associated with the IP address is in DNS query cache 168. In this case, verification device 104 can search DNS query cache 168, and can determine that the IP address is not included in DNS query cache 168. This may indicate that the IP address was not previously subject to a DNS query and an associated security verification and that the IP address was not identified in a set of permissible destinations as described above.

As further shown in FIG. 1D, and by reference number 182, based on determining that the target destination is not included in DNS query cache 168, verification device 104 can block establishment of a connection between user device 102 and another target destination, which corresponds to the IP address. In this case, verification device 104 can avoid transmitting a response to user device 102, can establish a connection to another webpage (e.g., an administrative webpage providing information indicating that verification device 104 blocked establishment of a connection to the target destination), and/or the like. Additionally, or alternatively, verification device 104 may refrain from responding to user device 102 to cause a browser of user device 102 to time out. Additionally, or alternatively, verification device 104 may provide a warning for display to a user, which may cause user device 102 to request further input from a user before accessing the target destination.

In some implementations, verification device 104 may perform a real-time security check. For example, based on determining that the target destination is not included in DNS query cache 168, verification device 104 may perform a security check on the target destination, and may add the target destination to the DNS query cache (e.g., without having performed a DNS query) based on the target destination passing the security check. In some implementations, verification device 104 may request that a security device perform an offline security check on the target destination, to enable verification device 104 to determine whether to establish a connection to the target destination a next time that a user device requests a connection to the target destination. In this way, verification device 104 reduces a likelihood of connecting user device 102 to a malicious destination relative to establishing connections based on network connection requests, which do not include DNS queries, without performing security verifications, thereby improving security for user device 102.

As indicated above, FIGS. 1A-1D are provided merely as examples. Other examples can differ from what was described with regard to FIGS. 1A-1D.

Figure 2:
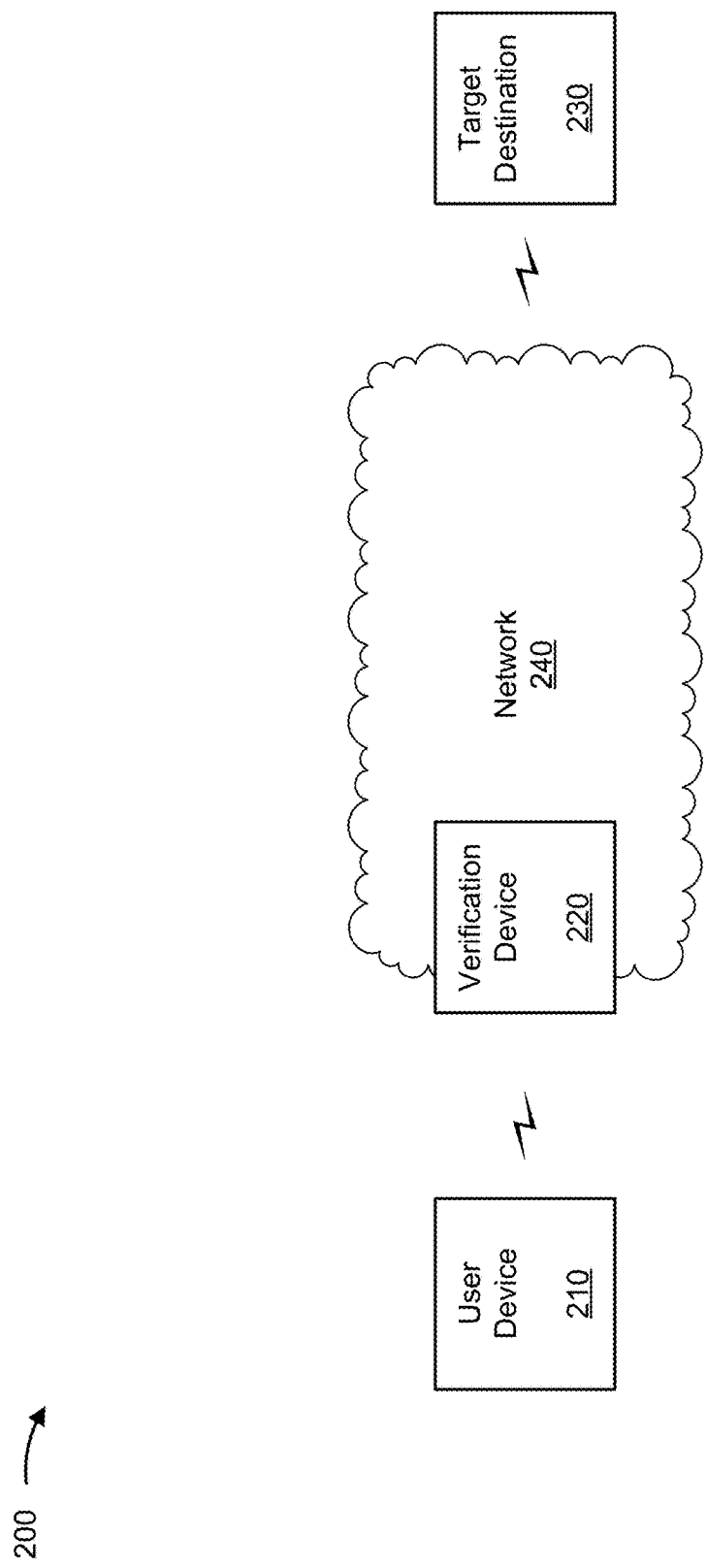
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a user device 210, a verification device 220, a target destination server device 230, and a network 240. Devices of environment 200 can interconnect via wired connections, wireless connections, or a combination of wired and wireless connections.

User device 210 includes one or more devices capable of receiving, generating, storing, processing, and/or providing information associated with accessing target destination server device 230. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Verification device 220 includes one or more devices (e.g., one or more traffic transfer devices) capable of processing and/or transferring traffic between user device 210 and target destination server device 230. For example, verification device 220 can include a network device that can include a firewall, a router, a gateway, a switch, a hub, a bridge, a reverse proxy, a server (e.g., a proxy server), a security device, an intrusion detection device, a load balancer, a DNS server, a DNS query device, or a similar device. In some implementations, verification device 220 can be an edge device of network 240.

Target destination server device 230 includes one or more devices capable of storing, processing, and/or routing information associated with providing a connection between a destination and user device 210. In some implementations, target destination server device 230 may be one or more servers associated with providing one or more webpages of a destination. In some implementations, target destination server device 230 can be associated with a DNS entry. For example, target destination server device 230 can be accessible using an IP address that corresponds to a domain name, and a mapping of the domain name to the IP address can be stored in a DNS server.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
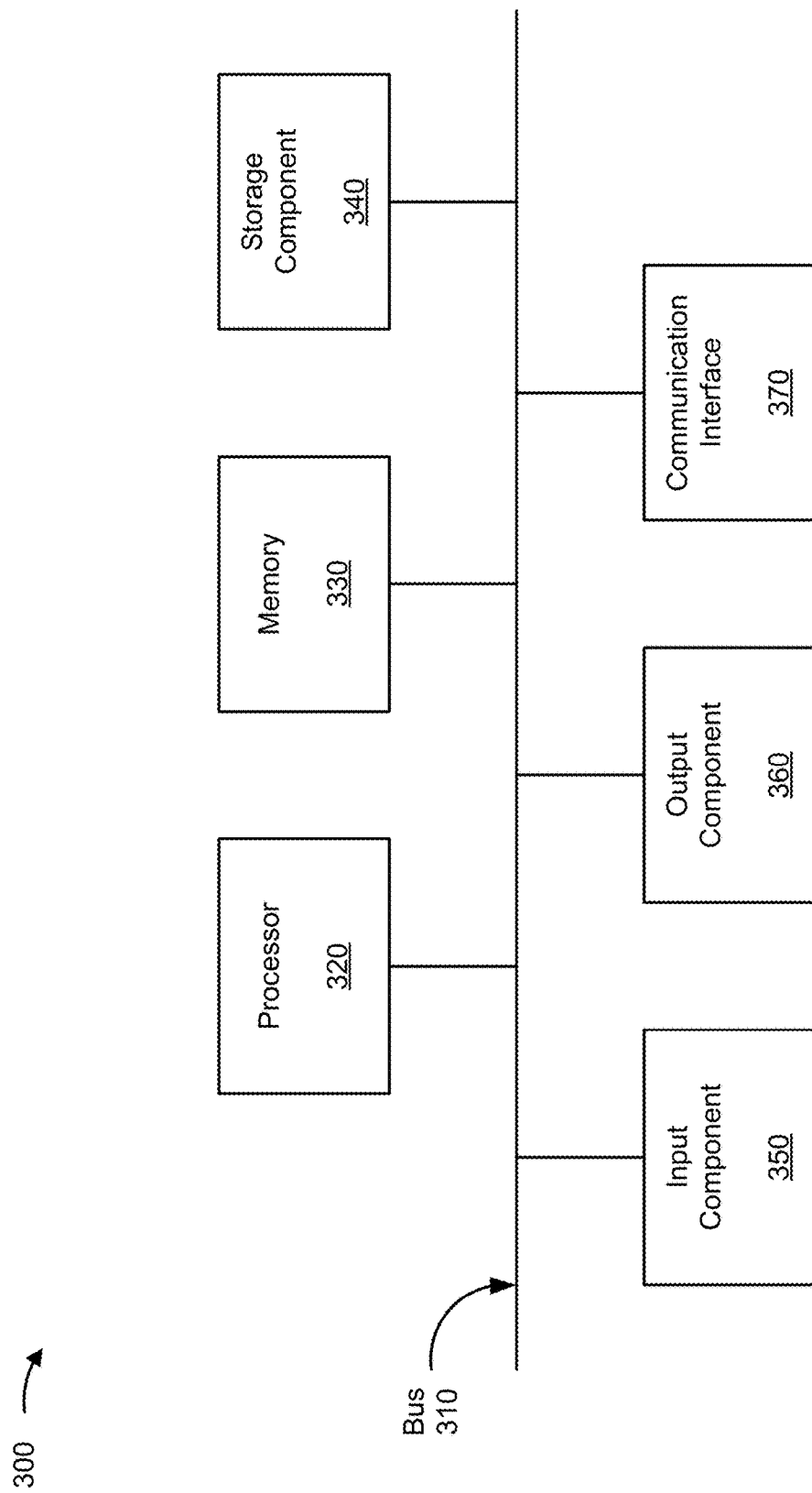
FIG. 3 is a diagram of example components of one or more devices of FIG. 2.

FIG. 3 is a diagram of example components of a device 300. Device 300 can correspond to user device 210, verification device 220, and/or target destination server device 230. In some implementations, user device 210, verification device 220, and/or target destination server device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
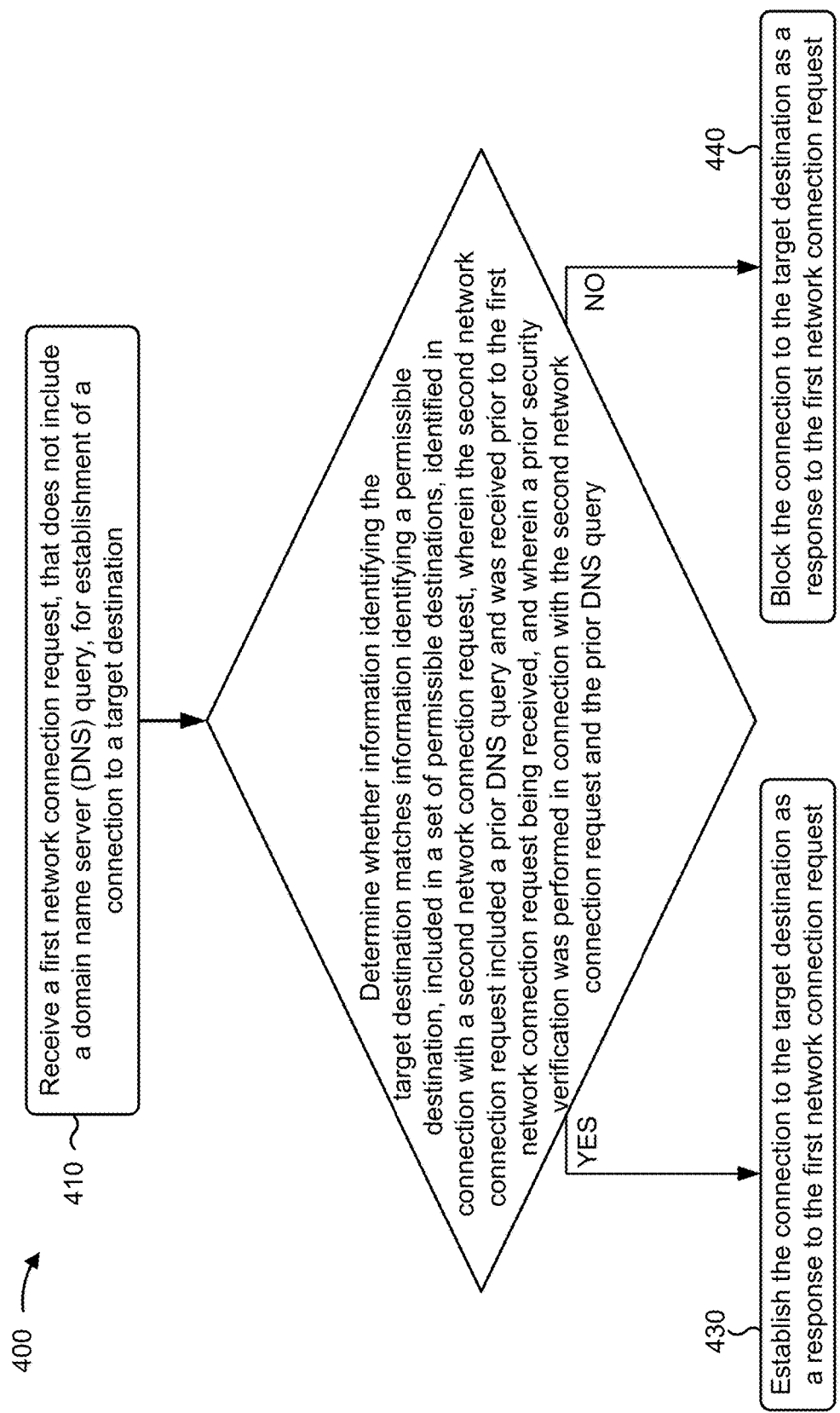
FIG. 4 is a flow chart of an example process for domain name server based validation of network connections.

FIG. 4 is a flow chart of an example process 400 for domain name server based validation of network connections. In some implementations, one or more process blocks of FIG. 4 can be performed by a verification device (e.g., verification device 220). In some implementations, one or more process blocks of FIG. 4 can be performed by another device or a group of devices separate from or including a verification device (e.g., verification device 220), such as a user device (e.g., user device 210) and a target destination (e.g., target destination server device 230).

As shown in FIG. 4, process 400 can include receiving a first network connection request, that does not include a domain name server (DNS) query, for establishment of a connection to a target destination (block 410). For example, the verification device (e.g., using processor 320, memory 330, storage component 340, input component 350, communication interface 370, and/or the like, and/or the like) can receive a first network connection request, that does not include a domain name server (DNS) query, for establishment of a connection to a target destination, as described above.

As further shown in FIG. 4, process 400 can include determining whether information identifying the target destination matches information identifying a permissible destination, included in a set of permissible destinations, identified in connection with a second network connection request, wherein the second network connection request included a prior DNS query and was received prior to the first network connection request being received, and wherein a prior security verification was performed in connection with the second network connection request and the prior DNS query (block 420). For example, the verification device (e.g., using processor 320, memory 330, storage component 340, and/or the like, and/or the like) can whether information identifying the target destination matches information identifying a permissible destination, included in a set of permissible destinations, identified in connection with a second network connection request, as described above. In some implementations, the second network connection request included a prior DNS query and was received prior to the first network connection request being received. In some implementations, a prior security verification was performed in connection with the second network connection request and the prior DNS query.

As further shown in FIG. 4, if verification device 220 determines that information identifying the target destination matches information identifying the permissible destination (block 420—YES), then process 400 can include establishing the connection to the target destination as a response to the first network connection request (block 430). For example, the verification device (e.g., using processor 320, memory 330, storage component 340, input component 350, output component 360, communication interface 370, and/or the like, and/or the like) can establish the connection to the target destination as a response to the first network connection request, as described above.

As further shown in FIG. 4, if verification device 220 determines the information identifying the target destination does not match information identifying any permissible destination included in a set of permissible destinations (block 420—NO), then process 400 can include blocking the connection to the target destination as a response to the first network connection request (block 440). For example, the verification device (e.g., using processor 320, memory 330, storage component 340, input component 350, output component 360, communication interface 370, and/or the like, and/or the like) can block the connection to the target destination as a response to the first network connection request, as described above.

Process 400 can include additional implementations, such as any single implementation or any combination of implementations described below and/or in connection with one or more other processes described elsewhere herein.

In some implementations, the verification device can receive, before receiving the first network connection request, the second network connection request; establish, after receiving the second network connection request and before receiving the first network connection request, a prior connection to the target destination; store, before receiving the first network connection request, information indicating that the target destination is the permissible destination based on success of the prior security verification in connection with establishment of the prior connection to the target destination; and establish the connection based on the information indicating that the target destination is the permissible destination.

In some implementations, the verification device can perform the prior security verification on the second network connection request based on receiving the second network connection request, and can establish the prior connection based on performing the prior security verification. In some implementations, when selectively establishing or blocking the connection to the target destination, the verification device can block the connection to the target destination based on the information identifying the target destination does not match information identifying any permissible destination in the set of permissible destinations. In some implementations, the verification device can receive information identifying one or more permissible destinations, and can add the one or more permissible destinations to the set of permissible destinations.

In some implementations, the verification device can receive information identifying a user device associated with the first network connection request and, when selectively establishing or blocking the connection to the target destination, the verification device can selectively establish or block the connection to the target destination based on the information identifying the user device associated with the first network connection request. In some implementations, the verification device can provide information indicating a set of destinations to a validation device, and can receive validation information indicating that a subset of the set of destinations are validated for inclusion in the set of permissible destinations. In some implementations, the information identifying the target destination is an Internet protocol (IP) address and the information identifying the permissible destination is the same IP address.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise forms disclosed. Modifications and variations can be made in light of the above disclosure or can be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A verification device, comprising:
one or more memories; and
one or more processors, communicatively coupled to the one or more memories, to:

store, based on determining whether information identifying a set of permissible destinations is authentic, the information identifying the set of permissible destinations;

receive a first network connection request, that does not include a domain name server (DNS) query, for establishment of a connection to a target destination;

determine whether information identifying the target destination matches information identifying a permissible destination, included in the set of permissible destinations, identified in connection with a second network connection request, wherein the second network connection request included a prior DNS query and was received prior to the first network connection request being received, wherein a prior security verification was performed in connection with the second network connection request and the prior DNS query, and wherein the prior security verification comprises providing a sandbox environment to connect to the target destination and receive feedback indicating whether the target destination is classified as malicious or not; and selectively establish or block the connection to the target destination as a response to the first network connection request based on whether the information identifying the target destination matches the information identifying the permissible destination, included in the set of permissible destinations.

2. The verification device of claim 1, wherein the one or more processors are further to:

receive, before receiving the first network connection request, the second network connection request;

establish, after receiving the second network connection request and before receiving the first network connection request, a prior connection to the target destination; and store, before receiving the first network connection request, information indicating that the target destination is the permissible destination based on success of the prior security verification in connection with establishment of the prior connection to the target destination; and wherein the one or more processors, when selectively establishing or blocking the connection, are to:

establish the connection based on the information indicating that the target destination is the permissible destination.

3. The verification device of claim 2, wherein the one or more processors are further to:

perform the prior security verification on the second network connection request based on receiving the second network connection request; and establish the prior connection based on performing the prior security verification.

4. The verification device of claim 1, wherein the one or more processors, when selectively establishing or blocking the connection to the target destination, are to:

block the connection to the target destination based on determining that the information identifying the target destination does not match information identifying any permissible destination in the set of permissible destinations.

5. The verification device of claim 1, wherein the one or more processors are further to:

receive information identifying a user device associated with the first network connection request; and wherein the one or more processors, when selectively establishing or blocking the connection to the target destination, are to:

selectively establish or block the connection to the target destination based on the information identifying the user device associated with the first network connection request.

6. The verification device of claim 1, wherein the one or more processors are further to:

provide information indicating a set of destinations to a validation device; and receive validation information indicating that a subset of the set of destinations are validated for inclusion in the set of permissible destinations.

7. The verification device of claim 1, wherein the information identifying the target destination is an Internet protocol (IP) address and the information identifying the permissible destination is the same IP address.

8. The verification device of claim 1, wherein the one or more processors, when determining whether the information identifying the set of permissible destinations is authentic, are to at least one of:

determine that the information identifying the set of permissible destinations is received from a verified source, or determine that the information identifying the set of permissible destinations has not been altered in transit from the verified source.

9. The verification device of claim 1, wherein the one or more processors, selectively establishing or blocking the connection to the target destination, are to:

perform a security check on the target destination based on determining that the target destination does not match the information identifying the permissible destination; and add the target destination to the set of permissible destinations based on the target destination passing the security check.

10. A non-transitory computer-readable medium storing one or more instructions that, when executed by one or more processors of a verification device, cause the one or more processors to:

store, based on determining whether information identifying a set of permissible destinations is authentic, the information identifying the set of permissible destinations;

receive a first network connection request, that does not include a domain name server (DNS) query, for establishment of a connection to a target destination;

determine whether information identifying the target destination matches information identifying a permissible destination, included in the set of permissible destinations, identified in connection with a second network connection request, wherein the second network connection request included a prior DNS query and was received prior to the first network connection request being received, wherein a prior security verification was performed in connection with the second network connection request and the prior DNS query, and wherein the prior security verification comprises providing a sandbox environment to connect to the target destination and receive feedback indicating whether the target destination is classified as malicious or not; and selectively establish or block the connection to the target destination as a response to the first network connection request based on whether the information identifying the target destination matches the information identifying the permissible destination, included in the set of permissible destinations.

11. The non-transitory computer-readable medium of claim 10, wherein the one or more instructions, when executed by the one or more processors, further cause the one or more processors to:

receive, before receiving the first network connection request, the second network connection request;

establish, after receiving the second network connection request and before receiving the first network connection request, a prior connection to the target destination; and store, before receiving the first network connection request, information indicating that the target destination is the permissible destination based on success of the prior security verification in connection with establishment of the prior connection to the target destination; and wherein the one or more instructions, that cause the one or more processors to selectively establish or block the connection, cause the one or more processors to:
establish the connection based on the information indicating that the target destination is the permissible destination.

12. The non-transitory computer-readable medium of claim 11, wherein the one or more instructions, when executed by the one or more processors, further cause the one or more processors to:

perform the prior security verification on the second network connection request based on receiving the second network connection request; and establish the prior connection based on performing the prior security verification.

13. The non-transitory computer-readable medium of claim 10, wherein the one or more instructions, that cause the one or more processors to selectively establish or block the connection to the target destination, cause the one or more processors to:

block the connection to the target destination based on determining that the information identifying the target destination does not match information identifying any permissible destination in the set of permissible destinations.

14. The non-transitory computer-readable medium of claim 10, wherein the one or more instructions, when executed by the one or more processors, further cause the one or more processors to:

receive information identifying a user device associated with the first network connection request; and wherein the one or more instructions, that cause the one or more processors to selectively establish or block the connection to the target destination, cause the one or more processors to:
selectively establish or block the connection to the target destination based on the information identifying the user device associated with the first network connection request.

15. The non-transitory computer-readable medium of claim 10, wherein the one or more instructions, when executed by the one or more processors, further cause the one or more processors to:

provide information indicating a set of destinations to a validation device; and receive validation information indicating that a subset of the set of destinations are validated for inclusion in the set of permissible destinations.

16. The non-transitory computer-readable medium of claim 10, wherein the information identifying the target destination is an Internet protocol (IP) address and the information identifying the permissible destination is the same IP address.

17. A method, comprising:

storing, by a verification device and based on determining whether information identifying a set of permissible destinations is authentic, the information identifying the set of permissible destinations;

receiving, by the verification device, a first network connection request, that does not include a domain name server (DNS) query, for establishment of a connection to a target destination;

determining, by the verification device, whether information identifying the target destination matches information identifying a permissible destination, included in the set of permissible destinations, identified in connection with a second network connection request,
wherein the second network connection request included a prior DNS query and was received prior to the first network connection request being received,
wherein a prior security verification was performed in connection with the second network connection request and the prior DNS query, and
wherein the prior security verification comprises providing a sandbox environment to connect to the target destination and receive feedback indicating whether the target destination is classified as malicious or not; and selectively establishing or blocking, by the verification device, the connection to the target destination as a response to the first network connection request based on whether the information identifying the target destination matches the information identifying the permissible destination, included in the set of permissible destinations.

18. The method of claim 17, further comprising:

receiving, before receiving the first network connection request, the second network connection request;

establishing, after receiving the second network connection request and before receiving the first network connection request, a prior connection to the target destination;

storing, before receiving the first network connection request, information indicating that the target destination is the permissible destination based on success of the prior security verification in connection with establishment of the prior connection to the target destination; and establishing the connection based on the information indicating that the target destination is the permissible destination.

19. The method of claim 18, further comprising:

performing the prior security verification on the second network connection request based on receiving the second network connection request; and wherein establishing the prior connection comprises:
   establishing the prior connection based on performing the prior security verification.

20. The method of claim 17, wherein selectively establishing or blocking the connection to the target destination comprises:
   blocking the connection to the target destination based on determining that the information identifying the target destination does not match information identifying any permissible destination in the set of permissible destinations.

\* \* \* \* \*